United States Patent

[11] 3,590,146

[72] Inventors Peter Johannes Hubertus Jansen;
Kian Kie Ong, both of Emmasingel,
Eindhoven, Netherlands
[21] Appl. No. 773,206
[22] Filed Nov. 4, 1968
[45] Patented June 29, 1971
[73] Assignee U.S. Philips Corporation
New York, N.Y.
[32] Priority Nov. 8, 1967
[33] Netherlands
[31] 6,715,137

[54] COLOR BURST CIRCUIT WITH A.G.C.
3 Claims, 1 Drawing Fig.

[52] U.S. Cl. 178/5.4 SY, 178/5.4 AC
[51] Int. Cl. H04n 9/46, H04n 9/48
[50] Field of Search 178/5.4, 5.4 ACC, 5.4 SYNC, 69.5 CB

[56] References Cited
UNITED STATES PATENTS
2,875,272 2/1959 Cuccia ........................ 178/5.4
FOREIGN PATENTS
221,727 1/1958 Australia ...................... 178/5.4 ACC

*Primary Examiner*—Robert L. Richardson
*Attorney*—Frank R. Trifari

ABSTRACT: A color television receiver has at least partially separate color information and burst signal paths. A passive burst subcarrier regenerator is located within said burst signal path. In order to supply a constant amplitude regenerated subcarrier without effecting the amplitude of the color information signal, an amplitude detector is coupled to the output of the regenerator. The detected signal goes through a high-pass filter and is used to control the gain of an amplifier located exclusively within the burst signal path.

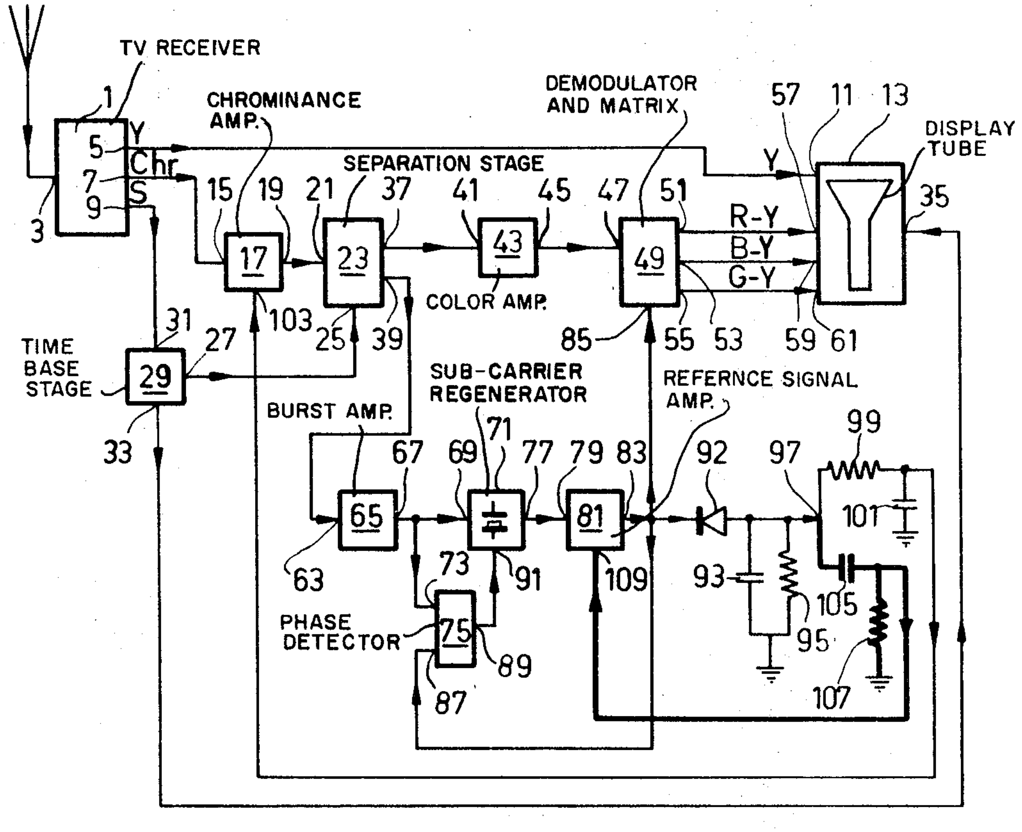
INVENTORS
PETER J.H. JANSSEN
KIAN K. ONG
BY
Frank R. Trifari
AGENT

COLOR BURST CIRCUIT WITH A.G.C.

The invention relates to a color television receiver having a color information signal path and a burst signal path, which burst signal path includes a color subcarrier regenerator of a passive type (passive integrator) so that a burst signal obtained from a received color television signal can be converted into a color subcarrier reference signal, the burst signal path including a detection circuit for obtaining at an output thereof an automatic gain control signal from the color subcarrier reference signal.

In known receivers of the above-mentioned type the drawback occurs that particularly upon reception of weak signals the color subcarrier reference signal may show great fluctuations as a result of the burst signal decreasing in amplitude sometimes during a number of successive line periods. This reference signal is used for synchronously demodulating the color difference signals which are passed through the color information signal. Upon variation in the amplitude of the reference signal this may give rise to color errors upon this demodulation. Consequently, to prevent this phenomenon a limiter stage is generally included after the passive integrator. However, this limiter does not operate at a slight amplitude of the integrated burst signal. The operation of this limiter may be rendered more effective by using more amplification stage for this limiter. From an economic point of view this is, however, not particularly interesting. An object of the invention is to avoid as must as possible the occurrence of color errors upon reception of weak signals.

According to the invention a color television receiver of the type described in the preamble is characterized in that the said output of the detection circuit is connected through a low cutoff filter to a gain-control input of an amplifier included in the burst signal path outside the color information signal path.

As a result an automatic gain control is obtained which acts upon comparatively rapid variation in the amplitude of the regenerated color subcarrier reference signal and which tends to maintain the amplitude of this reference signal constant. By the step according to the invention this rapid automatic gain control is not effective in the color information signal path. This is based on the recognition of the fact that due to the short duration of the burst signals amplitude variation often occur in the individual bursts, which variation are not representative of the amplitude variations which occur in the associated line periods in the color information signal. Any automatic gain control for the color information signal path obtained from the burst signal path must therefore not be influenced by accidental fluctuations of the burst signal amplitude, such as occur particularly upon reception of weak signals.

In order that the invention may be readily carried into effect it will now be described in detail, by way of example, with reference to the accompanying diagrammatic drawing which shows a color television receiver according to the invention in a block diagram.

Details which are not important for the understanding of the invention have been omitted as much as possible for the sake of clarity.

In the Figure, a section of the receiver is indicated by 1 in which a color television signal receiver through an input 3 is amplified and converted into a brightness signal Y, a chrominance signal 1 Chr and a synchronization signal S. These signals occur at the outputs 5, 7 and 9, respectively, of the section 1.

The output 5 of the section 1 is connected to an input 11 of a picture display section 13. The brightness signal Y is applied through this line to the picture display section 13.

The output 7 of the section 1 is connected to an input 15 of a chrominance amplifier 17. An output 19 of the chrominance amplifier 17 is connected to an input 21 of a separator stage 23. The separator stage 23 further has an input 25 which is connected to an output 27 of a time base state 29, through which line it is possible to apply a switching signal to the separator stage 23.

The time base stage 29 receives a synchronization signal S from an input 31 connected to the output 9 of the section 1 and supplies time base currents to the picture display section 13 through an output 33 which is connected to an input 35 of the picture display section 13.

The chrominance signal Chr becoming available at the output 7 of the section 1 comprises a color information signal and a burst signal. The color information signal is applied from the output 7 through the chrominance amplifier 17 and the separator stage 23 to an output 37 thereof and the burst signal is applied from the output 7 through the chrominance amplifier 17 and the separator stage 23 to an output 39 of this stage. To this end a time selection is applied on the chrominance signal in the separator stage 23 with the aid of a switching signal applied to the input 25.

The output 37 is connected to an input 41 of a color information signal amplifier 43. An output 45 thereof is connected to an input 47 of a demodulator and matrix circuit 49. The demodulator and matrix circuit 49 has three outputs 51, 53 and 55 which are connected to inputs 57, 59 and 61, respectively, of the picture display section 13.

The signal path leading from the output 7 of the section 1 through the chrominance amplifier 17, the separator stage 23, the output 37 of this separator stage, the color information amplifier 43 to the input 47 of the demodulator and matrix circuit 49 belongs to the color information signal path. The color information signal is applied through this path to the demodulator and matrix circuit 49.

The output 39 of the separator stage 23 is connected to an input 63 of a burst signal amplifier 65. An output 67 of the burst signal amplifier 65 is connected to an input 69 of a passive integrator circuit 71 and to an input 73 of a phase detection circuit 75. The passive regenerator is a high-Q crystal circuit. This circuit along with the phase detector and their operation are described in "Proceedings of the I.R.E.," Jan. 1954, vol. 42, pp. 111—112.

The color subcarrier burst are integrated to form a continuous reference signal with the aid of the passive integrator circuit 71. This reference signal becomes available at the output 77. The output 77 is connected to an input 79 of a reference signal amplifier 81. A reference signal which is applied to an input 85 of the demodulator and matrix circuit 49 becomes available at an output 83 of this amplifier.

The reference signal is further applied to an input 87 of the phase detection circuit 75. The phase of the burst signal applied through the input 73 is compared in the phase detection circuit 75 with that of the integrated burst signal (reference signal) applied through the input 87. A voltage which is a measure of the phase deviation between these two signals is obtained at an output 89. The output 89 is connected to the input 91 of the passive integrator circuit 71. A phase deviation possibly produced in the integrator circuit 71 is corrected with the aid of the voltage applied through this line, so that the phase of the reference signal obtained at the output 83 is maintained as much as possible the same as that of the burst signal applied to the input 69.

The reference signal obtained at the output 83 is further applied to a detection circuit having a diode 92, a capacitor 93 and a resistor 95. A voltage dependent on the amplitude of the reference signal is obtained from an output 97 of the detection circuit 92, 93, 95. This voltage is applied through a low-pass filter serving as a high cutoff filter including a resistor 99 and a capacitor 101 to a gain control input 103 of the chrominance amplifier 17. The gain of the chrominance amplifier 17 is thus dependent on the average amplitude of the burst signal. This average amplitude is thus maintained substantially constant. The average amplitude of the burst signal is a measure of the amplitude of the color information signal. Hence the color information signal appears with a automatically corrected amplitude at the output 19 of the chrominance amplifier 17. The saturation of a picture obtained with the aid of the color information signal will thus be substantially independent of variations in the transmission of the transmission path of the color television signal.

The above described trajectory from the output 7 of the section 1 through the chrominance amplifier 17, the output 39 of the separator stage, the burst signal amplifier 65, the passive integrator circuit 71, the reference signal amplifier 81 and the detection circuit 92, 93 95 belongs to the burst signal path. Part of the burst signal path, namely the chrominance amplifier 17, coincides with part of the color information signal path.

According to the invention the output 97 of the detection circuit 92, 93, 95 provided in the burst signal path is connected through a high-pass filter serving as a low cutoff filter, including a capacitor 105 and a resistor 107, to a gain control input 109 of an amplifier 81 included outside the color information signal path. Rapid variations in the output signal of the reference signal amplifier 81 will be readjusted by the automatic gain control circuit thus formed without exerting influence on the color information signal path.

According to the invention this rapid automatic gain control, which is effected outside the color information signal path, is based on the recognition of the fact that rapid variations in the amplitude of the burst signal such as occur, for example, upon reception of weak signals or during the frame flyback period, are no measure of the variations in the color information signal and hence must not exert influence on a possible automatic gain control in the color information signal path.

By the step according to the invention a very constant reference signal voltage amplitude is obtained at the input 85 of the demodulator and matrix circuit 49 so that it will substantially be impossible for color errors to occur due to the demodulation of the color information signal, even with unfavorable conditions of reception.

The lower limit frequency of the high-pass filter 105, 107 is preferably chosen to be such that it is higher than the upper limit frequency of the low-pass filter 99—101.

It will be evident that the rapid automatic gain control according to the invention can be used in color television receivers for both the NTSC-system and the PAL-system.

Although the described embodiment includes a control voltage from the output 97 of the detection circuit 92, 93, 95 to the input 103 of the chrominance amplifier 17. It is readily evident that this voltage is not essential for using the step according to the invention. However, to ensure a satisfactory operation of the color difference signal demodulators it is generally desirable to apply this control voltage to the input 103.

In the embodiment described the feedback of the rapid automatic gain control is effected in the reference signal amplifier 81 following the passive integrator circuit 71. The feedback may in principle also be effected in an amplifier, for example, preceding the passive integrator circuit or, at will, preceding as following it.

We claim:

1. A circuit comprising: means for receiving a color television signal having amplitude varying color information and burst signal components, means coupled to said receiving means for separating said components from said television signal, a burst signal path coupled to said separating means for receiving only said burst signal, said path comprising the serial coupling of means for passively regenerating a subcarrier reference signal from said burst signal, means having a control terminal for controlling the amplitude of said subcarrier reference signal within said burst signal path without effecting the amplitude of said color information signals, means for detecting the amplitude of the output of said amplitude controlling means and a high pass filter coupled between said detecting means and said control terminal; whereby said reference signal is kept at a substantially constant amplitude regardless of the rapidity of said variations.

2. A circuit as claimed in claim 1 further comprising a chrominance amplifying means for amplifying both said color information and burst signal components and means for controlling the gain of said chrominance amplifier coupled to the output of said detecting means.

3. A circuit as claimed in claim 2 wherein said chrominance signal amplifier-controlling means comprises a low-pass filter having a higher cutoff frequency than said high-pass filter.